March 8, 1966  DAVID CHANG  3,239,823
TWIN GAP FLUX RESPONSIVE HEAD

Filed May 16, 1962  5 Sheets-Sheet 1

INVENTOR
DAVID CHANG
BY Lester N. Clark
ATTORNEY

March 8, 1966        DAVID CHANG        3,239,823

TWIN GAP FLUX RESPONSIVE HEAD

Filed May 16, 1962        5 Sheets-Sheet 4

March 8, 1966   DAVID CHANG   3,239,823
TWIN GAP FLUX RESPONSIVE HEAD
Filed May 16, 1962   5 Sheets-Sheet 5

United States Patent Office 3,239,823
Patented Mar. 8, 1966

3,239,823
TWIN GAP FLUX RESPONSIVE HEAD
David Chang, Poughkeepsie, N.Y., assignor to International Business Machines Corporation, New York, N.Y., a corporation of New York
Filed May 16, 1962, Ser. No. 195,267
14 Claims. (Cl. 340—174.1)

This application is a continuation-in-part of my copending applications, Serial Nos. 15,935 and 16,058, both filed March 18, 1960, and both now abandoned.

This invention relates to a method and apparatus for reproducing signals magnetically recorded on tape or the like. More particularly, the invention relates to a transducer for reading magnetic records from a slowly moving or static record carrier.

In conventional magnetic record transducers the head is constructed to provide a single narrow gap between a pair of core pieces over which the magnetic recording passes as the record is being read. The flux field of the record links the core pieces across the gap and induces an output voltage in a coil wound about the core. Heads of this type depend on the relative rapid movement between the head and the magnetic signal carrier to produce an output voltage since otherwise the amplitude of the induced voltage is too small to reproduce the record signal. They are, therefore, not adapted to static signal sensing.

It has also been suggested to provide flux responsive magnetic signal reproducing heads which are not dependent for their operation on rapid relative movement between the magnetic signal carrier of the head, but which are designed to produce an electrical output signal which is a facsimile of the magnetic record flux, rather than one that is proportional to the time derivative of the recorded flux pattern as in conventional transducers. Flux responsive heads operate on the principles of transducing flux to a voltage by periodically varying the reluctance of the head core, e.g., by excitation with alternating current flowing through an exciting coil, at a frequency of $f_0$, and detecting an amplitude modulation of the second harmonic current induced in a reading coil, which amplitude is proportional to the flux read from the magnetic signal carrier.

The magnetic record reading heads of the above-mentioned conventional types suffer the disadvantage that the demodulated output of some magnetic records provide no fixed D.C. reference for the reason that the head senses not only the flux directly over its gap, but the resultant of all the flux over the top surface of the head at both sides of the gap. These heads produce an output waveform which is a function of the distance the magnetic record travels along the face of the head, i.e., the signal sensitive area of the head is located not only at the gap but on either side of the gap as well. Accordingly, these heads have relatively poor sensitivity and comparatively poor signal resolution.

These defects are particularly marked with longitudinal steady state recordings, such as those produced by the well known non-return-to-zero technique which is widely used to record data in the binary notation. In non-return-to-zero recording, the individual writing current pulses are spread out in time so that they occupy a full bit cell. The name is derived from the fact that the pulses lose their individuality, and the writing current does not return to zero between successive 0's or successive 1's. In one common form of non-return-to-zero recording known as NRZI (non-return-to-zero-IBM), the magnetic storage surface is continuously magnetized to saturation in one direction or the other with the direction of magnetization being reversed in a bit cell in which a 1 is recorded and being maintained constant in either direction in a bit cell in which a 0 is recorded.

It is, therefore, the primary object of the invention to provide a novel and improved method and apparatus of improved sensitivity and resolution for reading a binary magnetic record.

Another object is to provide a method and apparatus of the type described in which oppositely poled portions of the magnetic record produce alternating output signals of opposite phase, whereby the polarity of the record portion being read may be detected.

Another object is to provide a method and apparatus of the type described in which the apparatus includes magnetic circuit means defining two non-magnetic gaps adjacent the magnetic record, the two gaps being spaced apart in the direction of relative movement of the magnetic circuit means and record, and in which the output signal is determined only by the portion of the record between the two gaps and is not substantially influenced by the magnetic record on either side of the two gaps.

A further object is to provide a method and apparatus of the type described which produces a sharp output pulse when and only when a pole of the magnetic record is located between the two gaps.

The foregoing and other objects of the invention are attained in the apparatus and methods described herein. It is essential to the invention that the magnetic record include poles, which may be defined as areas of the record member in which the flux lines extend generally perpendicular to the record surface. For example, such poles are found in binary magnetic records of the NRZI type.

The apparatus includes magnetic circuit means defining two non-magnetic gaps. The magnetic circuit means is positioned adjacent the path of movement of the record member, with the two gaps spaced in the direction of movement of the record member by a distance which is less than the minimum pole spacing which may be encountered on the record. In one species of the invention described herein, the magnetic circuit means comprises a single magnetic structure forming two loops, each loop having a gap therein. In another species, two separate magnetic circuits are employed, each with its own gap.

Means are provided to vary cylically the reluctance of at least a portion of the magnetic circuit means at a predetermined frequency. Electromagnetic coupling means are provided between the magnetic circuit means and two output terminals.

The magnetic circuit means and the electromagnetic coupling means are so constructed that flux from a pole of the record member spaced outwardly of the gaps produces equal and opposite effects, either in the two loops of the magnetic circuit means, as in one species, or in the coupling means, as in the other species, so that no signal is produced at the output terminals. When a pole moves between the gaps, however, the two effects which were formerly opposite act to aid each other in producing an output signal. The resulting output signal is sharply defined, beginning when a pole crosses one gap and ending when it crosses the other. Furthermore, the polarity of the pole crossing the gap determines the phase of the output signal. Consequently, it is possible, by the use of a phase discriminator, to determine the polarity of the pole.

Among the advantages to be expected from the invention is a fixed reference for the output voltage which enables the sensing at zero instantaneous speed of magnetic records produced by the non-return-to-zero method, and also the utility of intrinsic character width that is built into the head by the distance separating the gaps, whereby the need for mechanically generated character gates is eliminated at random speed operation. The head will also read records recorded at higher density without limitation on interspersed low density recordings. Withal, a better signal resolution than heretofore obtainable is assured.

The invention will be dealt with in more specific form in the following detailed description which is to be read in conjunction with the drawings forming a part hereof. In the drawings, like reference numerals indicate like parts, and FIG. 1 is a perspective elevational view of a magnetic record transducer according to one embodiment of the invention;

FIGS. 1 AND 2

Figure 1:
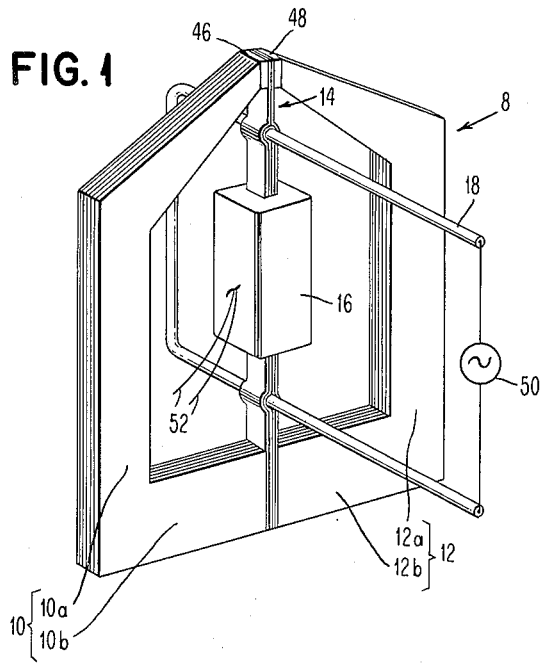

By reference to FIG. 1, it can be seen that a transducing head 8 there shown embodies as principal elements a generally symmetrical body structure presenting therein two non-magnetic gaps 46 and 48, a flux sensitive center probe 14 and a reading coil 16. The body structure may, for convenience, comprise a pair of generally U-shaped side members 10 and 12. The side members 10 and 12 are made of any suitable ferro-magnetic material. The center probe 14 may be constructed in whole or in part of the same material. A suitable material for the body structure is an alloy which has high permeability at low flux densities, such as the nickel-copper-iron alloy sold by Allegheny Ludlum Steel Corporation, under its trade name Mumetal.

The side members 10 and 12 are preferably laminated such that each is composed of a plurality of plates of the alloy.

Each of the side members 10 and 12 includes a leg 10a, 12a extending generally perpendicularly with respect to the path of movement of the record members (see FIGS. 6 and 7), and a bridging member 10b, 12b which extends between the center probe 14 (which may be considered a third leg) and the end of its associated leg 10a, 12a farthest from the record member.

Figure 2:
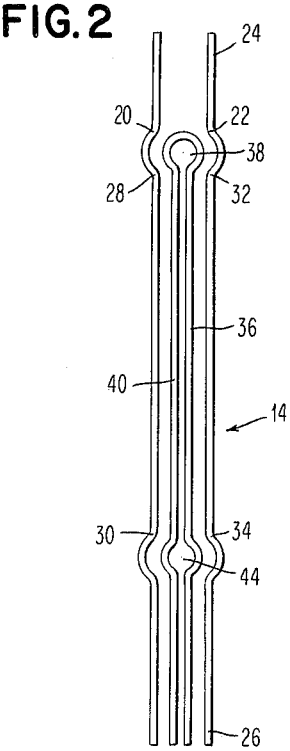
FIG. 2 is an edge elevational view of an enlarged scale of the laminations comprising a center probe of the transducer of FIG. 1.

The center probe 14, as more clearly shown in the enlarged exploded view thereof in FIG. 2, may consist of a pair of probe side plates 20 and 22 which, at least at their upper end portions, are in face to face contact when installed in the transducer. The probe side plates are formed of thin metal strips preferably about ½ mil in thickness and sufficiently wide to operate effectively in cooperation with a single channel of a magnetic record tape.

Any known method may be used to render the center probe flux sensitive, i.e., to vary its reluctance periodically. One such method involves the application of an alternating current to an exciting coil 18 associated with the probe 14, so as to vary the reluctance of the probe by varying the saturation thereof due to the alternating flux produced by the current in the exciting coil. As shown, the coil 18 may be a single turn coil which extends between the plates 20 and 22 near their upper ends and returns between those plates near their lower ends. Accordingly, the center probe 14 may be formed to accommodate the coil 18. To this end the tip 24 and the base 26 of the probe side plates 20 and 22, are formed, at localities spaced from their upper and lower ends, with a pair of complementary outwardly pressed loops of broad U-shaped configurations which, when the plates are placed in face to face relation, will form a pair of ducts through the probe 14, through which the excitation coil 18 may pass. The ducts extend across the probe in a direction perpendicular to the edges of the plates 20 and 22.

Thus, the probe side plate 20 has an outwardly pressed configuration 28 formed across its width at a substantial distance from its upper end and a similarly outwardly pressed configuration 30 at approximately the same distance from its base. Corresponding outwardly pressed configurations 32 and 34 respectively are formed in the probe side plate 20.

Since the probe side plates are of relatively thin metal, it may be useful to employ in connection therewith a reinforcing member 36, which, as seen in FIG. 2, consists of a high permeability metal strip which is bent back upon itself for forming a loop 38 at the upper end thereof. The loop 38 is adapted to seat within the duct formed by the opposite outwardly pressed complementary configurations 28 and 32 in the pole side plates 20 and 22, respectively.

Toward the bottom of the reinforcing member 36 its legs 40 and 42 are pressed outwardly in complementary fashion such that a loop 44 is formed between them. The loop 44 is adapted to seat in the duct formed across the probe by the complementary pressed configurations 30 and 34 in the respective pole side plates 20 and 22. The reinforcing member 36 may have an overall thickness of 1 or 2 mils.

One end of the probe is mounted at the base of the body structure remote from the non-magnetic gap. It may be clamped between the bridging members 10b, 12b of the side members 10 and 12. Whatever the mounting of the probe, it must be such that the tip of the probe extends between the upper ends of the side members 10 and 12. The spacing of the confronting faces of the side structures 10 and 12 at their upper ends, thereof, for certain records, is ideally about 2 mils. Thus, when the upper end of probe 14, which is about 1 mil thick, is inserted between these confronting faces, a gap 46 of ½ mil is formed between the upper end of the side structure 10 and the center probe 14, and a similar gap 48 is formed between the probe 14 and the upper end of the side structure 12. The center probe 14 and the side structures 10 and 12 are separated from each other by inserting into each gap 46, 48 a non-magnetic shim which may, for example, be made of polyethylene terephthalate resin, sold by E. I. du Pont de Nemours & Company under its trade name Mylar. The shims may be ½ mil thick. A transducing coil 16 is wound around the center probe 14 in that portion of the probe between the ducts which carry the excitation coil 18.

The distance between the outer faces of the gaps 46 and 48 (i.e., the sum of the thickness of the plates 20 and 22 and the shims in the gaps 46 and 48) may vary within a considerable range on which the principal limiting factors are record density and head length. For records now in common use, it is envisioned at the present that distance may be as much as .005" although the distance may be increased for environments which permit a greater distance. The .002" distance used in the specific embodiment described herein has yielded good results on reasonably dense records, although it is to be expected that the space between the gaps will be reduced to a minimum for records of greater density. The distance in question must always be less than the minimum space between poles in the magnetic record.

With a stationary magnetic record and with no exciting current in the coil 18, the magnetic flux from a pole on the record and threading through the center probe 14 is constant and hence no voltage is induced in the transducing coil 16. When the center probe 14 is periodically saturated by alternating magnetic flux produced by current flowing in coil 18 from a suitable generator 50, then the reluctance of the path taken by the flux field of the record through the center probe 14 varies at a rate equal to twice the frequency of the alternating current in coil 18. The current in the upper and lower ends of coil 18, induces equal and opposite magnetomotive forces in the probe 14, and hence produces no flux threading the transducing coil 16. The only effect of the current in coil 18 is the double frequency saturation of those parts of the probe in the immediate neighborhood of the two ends of coil 18. Consequently, the flux through probe 14 and coil 16 from a magnetic pole located between the gaps 46 and 48 has its amplitude varied at twice the frequency of the alternating current supplied by generator 50. This varying flux induces a voltage in the transducing coil 16 and in its output leads 52. The induced voltage has twice the frequency of the exciting current. When the magnetic record medium moves relative to the head, and the record flux field varies along its length, then the amplitude of the induced voltage is modulated in the same way as a modulated radio frequency carrier. When the magnetic record is at rest relative to the transducer, an unmodulated voltage results. The amplitude of the voltage is determined only by the strength of the magnetic record field and not by its rate of movement in respect to the reading head. Furthermore, as explained in detail below, the phase of the induced voltage is determined by the polarity of the record, and that polarity may be determined by detecting the phase of the induced voltage.

FIG. 3

While excellent results have been obtained from a head structure according to the illustration in FIG. 1 of the drawing, it is contemplated that modified structures will operate equally well. It may be suggested, therefore, that instead of using a single transducing coil wound about the center probe as in FIG. 1, a pair of transducing coils wound about the legs of the body structure may be employed as in FIG. 3.

Figure 3:
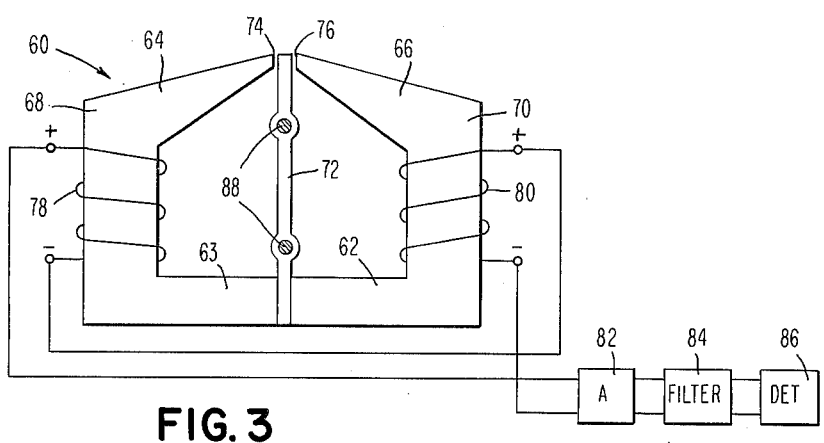
FIG. 3 is a more or less diagrammatic illustration of a modified form of transducer constructed in accordance with the invention, including a block diagram of an associated electric circuit.

By specific reference to FIG. 3, it can be seen that the core member 60 comprises a body providing a pair of bridging portions 62, 63 and a pair of face portions 64 and 66 remote from the bridging portions 62 and 63.

Legs 68 and 70 respectively interconnect the base portions 63 and 62 and the face portions 64 and 66, respectively. The center probe 72, which may be the same as that in the head of FIG. 1, is mounted with one end in contact with the bridging portions 62 and 63 and has its upper end projecting between the face portions 64 and 66 such as to form with the confronting surfaces of the face portions a pair of non-magnetic gaps 74 and 76. The center probe 72 and the core member form a pair of magnetic loops, one consisting of the probe 72, the left hand half of core 60, including bridging portion 63, leg 68 and face portion 64, and gap 74; and the other consisting of probe 72, the right-hand half of core 60, including bridging portion 62, leg 70 and face portion 66, and gap 76. The reading coils 78 and 80 are wound respectively about the legs 68 and 70. The coils are connected in series, as shown, in such a fashion that a magnetic flux extending in opposite senses through the legs 68 and 70 induces opposing electromotive forces in the coils 78 and 80, while magnetic fluxes extending in the same sense (i.e., both downward or both upward) through the legs 68 and 70 induce aiding electromotive forces in the coils 78 and 80. The coils 78 and 80 in series supply the input of an amplifier 82 which feeds a filter 84 to provide the signals to a detector 86, which may include a phase discriminator. As in the form shown in FIG. 1, that of FIG. 3 also contemplates an excitation coil 88 which extends through the center probe, together with means for impressing an alternating current on the coil 88.

A common feature of the two forms of the invention shown in FIGS. 1 and 3 is the association of the excitation coil with the center probe. It is believed that the best results will be obtained by impressing the excitation current on a coil associated with the center probe, whether the reading coil is on the center probe as in FIG. 1, or on the core legs as in FIG. 3. This does not, however, preclude the possibility of mounting the reading coil on the center probe while the excitation coil or coils are associated with the side members of the core structure.

FIGS. 1 and 3 disclose head structures adapted for use in connection with a single channel of the magnetic record. Since magnetic data processing systems utilize a coded binary notation, the number of magnetic record channels to be read simultaneously will vary with the nature of the code employed as well as because of other considerations. It is contemplated, therefore, that the head specifically shown herein can be built up by a number of mutually insulated duplicate sections to provide a transducer of as many channels as may be required. In this regard, it is to be noted that the excitation coil for the center probe lends itself readily to multi-channel heads.

The coil 16 of FIG. 1 may be connected to an output circuit such as that shown diagrammatically in FIG. 3, including amplifier 82, filter 84 and detector 86.

FIGS. 4 to 8

These figures illustrate graphically the operation of the transducers illustrated in FIGS. 1 to 3.

Figure 4:
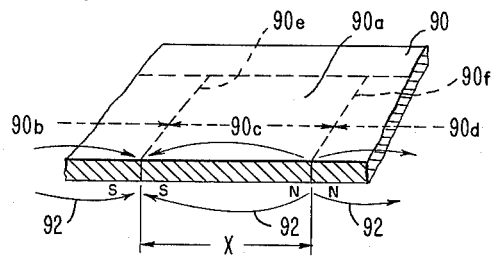
FIG. 4 is a view, partly in perspective and partly in section on the line 4—4 of FIG. 5, showing a magnetic record of a type which may be sensed by the use of the present invention.

In FIG. 4, there is shown a magnetic tape 90 having thereon a track 90a magnetized longitudinally. A first section of the track, part of which is shown at 90b, is magnetized with a north pole at its lefthand end, not shown in FIG. 4, and a south pole 90e at the righthand end. The next section of the track, shown at 90c is magnetized in the opposite sense, with south pole 90e at its lefthand end, and a north pole 90f at its righthand end. The third section of track appearing in FIG. 4, part of which is shown at 90d, is magnetized in the same direction as the section 90b, with the north pole 90f at its lefthand end.

Figure 5:
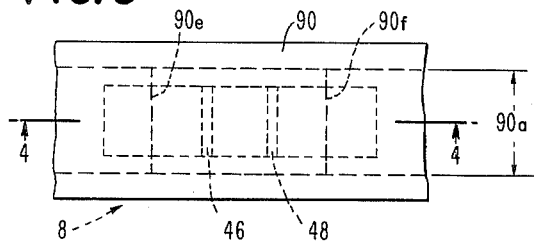
FIG. 5 is a plan view of the magnetic record of FIG. 4, with a transducer head appearing under the tape.
Figure 6:
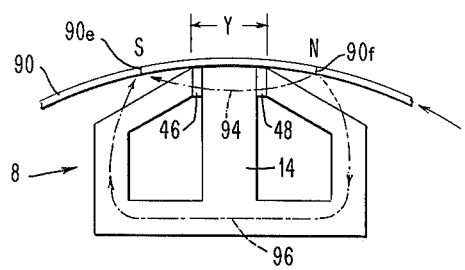
FIG. 6 is a somewhat diagrammatic elevational view of the tape and transducer head of FIG. 5, illustrating the flux paths which are effective in one condition of alignment of poles on the record.
Figure 7:
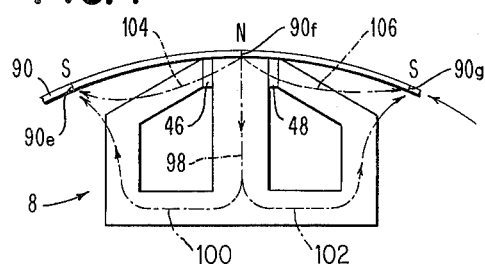
FIG. 7 is a view similar to FIG. 6, illustrating the flux paths in a different condition of alignment of the poles on the record.

Along the south pole 90e, where the sections 90b and 90c adjoin, the flux lines 92 enter the tape 90 substantially at right angles. Along the north pole 90f, where the sections 90c and 90d adjoin, the flux lines 92 leave the tape 90 substantially at right angles. The tape 90 is shown in FIGS. 5, 6 and 7 in its operative relation with the transducer head 8 of FIG. 1. In FIGS. 5, 6 and 7, the exciter coil 18 and the reading coil 16 have been omitted from the drawing, in order to avoid confusion and to show better the magnetic flux paths. In FIGS. 5 and 6, the tape 90 is shown extending across the top of the transducer head 8, with the south pole 90e to the left of the non-magnetic gap 46 and the north pole 90f to the right of the non-magnetic gap 48. Flux leaving the north pole 90f has a choice of two magnetic paths to follow. One such path is shown at 94 and crosses both gaps 46 and 48. The other path is shown at 96, and goes down through the outer legs and across the bridging members of the transducer head 8. Because of the absence of air gaps in this latter path, its reluctance is somewhat lower than that of the path 94, so that most of the flux passes through the path 96. Nevertheless, for any position of the pole 90f to the right of the gap 48, substantially one-half of the reluctance in the path 94 is located at gap 48, to the right of the center probe 14 and the other half at gap 46, to the left of the center probe 14. The two halves of the reluctance of the path 94 may be considered as consisting essentially of the reluctance of the two gaps 46 and 48, since the reluctance of the other parts of that path are relatively small. Furthermore, considering the path 96, it may be seen that for any position of the pole 90f to the right of the gap 48, substantially one-half of the reluctance of the path 96 is located to the right of the center probe 14 and substantially one-half to the left of the center probe 14. Accordingly, the upper and lower ends of the probe 14 are at substantially equal magnetic potentials and substantially no flux passes through the center probe 14 from the poles in the record track. Consequently, no electromotive force is induced in the coil 16, and no output signal is produced at its terminals. Note that any effect which the excitation coil 18 may have on the flux inside the coil 16 is balanced. In other words, if the upper half of the coil 18 induces a current in the upper part of coil 16, then the same current flowing in the lower half of coil 18 induces an equal and opposite current in the lower half of coil 16, so that the excitation current in the coil 18, by itself is never effective to produce an output signal at the terminals of coil 16.

Consider now the conditions illustrated in FIG. 7, where the pole 90f has moved to the left from its position in FIG. 6 and is now aligned with the top of the probe 14, having crossed the gap 48. The paths of magnetic flux from the pole 90f through the transducer head 8 are now entirely different. The principal flux leaves the pole 90f and passes directly downward along a path 98 through the probe 14 to the bottom thereof, where it splits, one half flowing outwardly in each direction along each of the two paths 100 and 102 through the side legs of the transducer head 8 to poles 90e and 90g on the record track 90. At the same time, some flux passes along a path 104 which crosses gap 46 and some flux passes along a path 106 which crosses gap 48. The flux in the paths 104 and 106 is relatively small because of the greater reluctance of the non-magnetic gaps in these paths. The flux flowing through path 98 is modulated by the alternating current flowing in the exciting coil 18, which varies the reluctance of the probe 14 at a frequency equal to double the frequency of the current supplied to the coil 18. Consequently, there is present in the core of the coil 16, a magnetic flux varying at that double frequency, which is effective to induce in the coil 16 an electromotive force of that same double frequency.

Figure 8:
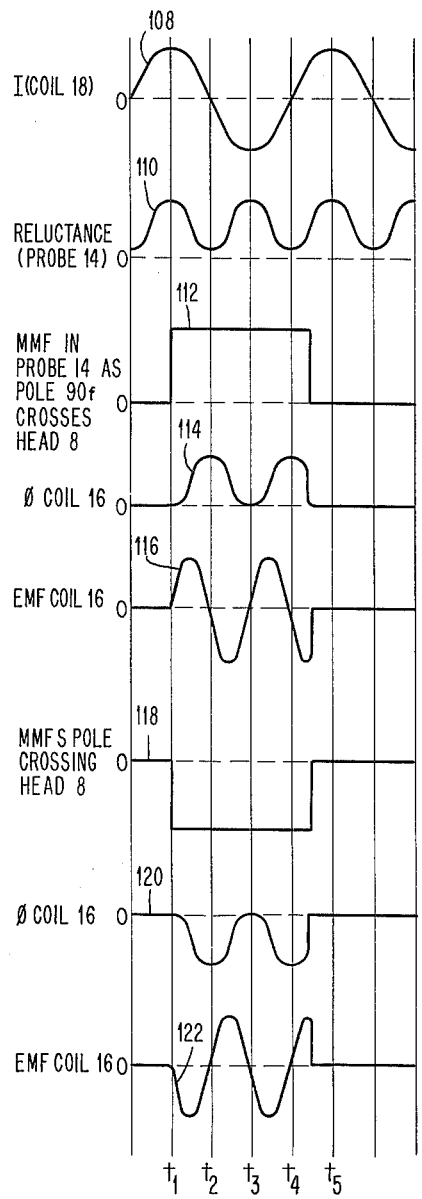
FIG. 8 is a graphical illustration of the variation with time of various electrical and magnetic conditions in the transducer of FIGS. 1 to 7.

Referring to FIG. 8, there is shown at 108 a sine wave representing an alternating current supplied to the coil 18 and identified by the legend I (coil 18). A sine wave 110 shows the variation in reluctance of probe 14 due to the presence of the exciting current 108. It will be understood that the reluctance of the probe 14 is at a minimum value when the current in coil 18 is zero, and has a maximum value whenever the current in coil 18 is at a maximum. Since the current in coil 18 passes through zero twice on each cycle, and has positive and negative peaks on each cycle, the reluctance has two negative peaks during each cycle of the coil current, those negative peaks corresponding to zero points of the coil current. Furthermore, the reluctance has two positive peaks, corresponding to the positive and negative peaks of the coil current. Consequently, the reluctance varies at a frequency twice that of the coil current. Curve 112 shows the variation of the magnetomotive force between the ends of the probe 14 as the pole 90f passes across the transducer head 8. It may be seen that the magnetomotive force remains substantially zero until the pole crosses the gap 48, which occurs at a time $t_1$. It is assumed that the record 90 moves from right to left as viewed in FIGS. 6 and 7. At the time $t_1$, the pole 90f crosses the gap 48 and the magnetomotive force in probe 14 suddenly shifts from the zero condition shown in FIG. 6 to the positive condition shown in FIG. 7. The magnetomotive force remains at this positive value until the pole 90f crosses the gap 46, which occurs between times $t_4$ and $t_5$, whereupon the magnetomotive force crosses the probe and drops back to its zero value.

As explained above, under the conditions of FIG. 6, there is substantially no resultant flux in the core of coil 16, but, as shown at 114 in FIG. 8, as soon as the pole 90f crosses the gap 48, the flux threading the coil 16 assumes the sine wave pattern produced by the substantially constant magnetomotive force at 112 impressed across the sinusoidally varying reluctance shown at 110. The flux waves shown at 114 induce in the coil 16 an electromotive force shown at 116 in FIG. 8, which may be read as an output signal.

The curve 118 of FIG. 8 shows the variation of the magnetomotive force in probe 14 as a south pole crosses the upper end of that probe. It will be seen that the curve 118 is similar to the curve 112, except that the polarity of the magnetomotive force is reversed. The magnetomotive force shown at 118 produces in the coil 16, a flux variation as shown at 120. It may be observed that this flux variation is similar to that shown at 114, except that it is 180° out of phase. The flux wave shown at 120 is effective to induce in the coil 16 an electromotive force shown at 122, which is similar to that shown at 116, except that it is 180° out of phase.

When reading a magnetic record formed in accordance with the NRZI system described above, each pole, whether north or south, has the same significance, namely a binary "1," while the absence of a pole indicates a binary "0." When reading a magnetic record formed in accordance with this system, the phase of the output signal is unimportant, and need not be detected.

When reading a record produced according to some other systems, magnetization of the record in one longitudinal direction is recorded as a binary "0," while magnetization in the opposite direction is recorded as a binary "1." In such a system, a pole of one polarity in the record represents the leading edge of a binary "1," while a pole of the opposite polarity represents the trailing edge. In such a system, the reading of the phase of the output signals is of utmost importance, in order to determine which are the leading and which are the trailing edges of the binary "1." This can be readily done when employing apparatus in accordance with the present invention, by supplying a phase discriminator in the detector connected to the terminals of the coil 16.

The flux paths illustrated in FIGS. 6 and 7 are applicable to the transducer head of FIG. 3 as well as to the transducer head of FIG. 1. It should be noted that when the flux paths 94 and 96 are effective, as in FIG. 6, the fluxes in the outer legs 68 and 70 of the transducer 60 of FIG. 3 are in opposite directions. The coils 78 and 80 of FIG. 3 are wound so that when flux is passing through them in the same direction, the electromotive forces induced therein add, but when the fluxes passing through them are in opposite directions, the induced electromotive forces oppose each other. Consequently, no signal will appear across the series connected coils 78 and 80 when a pole is in a position shown in FIG. 6, but a substantial signal will appear when a pole is in the position shown in FIG. 7. Furthermore, the exciting coil 88 has substantially no effect on the flux passing along the path 96 of FIG. 6, so that there would be no signal component of the carrier frequency appearing across the input of the amplifier 82. On the other hand, when the pole 90f is in the position shown in FIG. 7, the flux in the two coils 78 and 80 is modulated by the carrier frequency, so that the signal appearing at the input of amplifier 82 passes through the filter 84 to the detector 86. As mentioned above, the detector 86 may include a phase discriminator in those instances where the system of recording used renders the phase discrimination significant.

The minimum spacing between the poles in the magnetic record, which may be a distance such as that indicated at X in FIG. 4, must be greater than the spacing between the two air gaps, i.e., the distance indicated at Y in FIG. 6. The apparatus would produce no output signal if two poles of opposite polarity were to appear between the two gaps 46 and 48 at the same time. The center probe 14 would then act as a shunt for the flux from those two poles.

FIG. 9

The head 124 of this figure includes a pair of magnetic circuits 126 and 128 which may be identical except for the fact that the air gap 130 of magnetic circuits means 126 is displaced in the direction of record movement (i.e., to the left in the drawing) in respect to the air gap 132 of the magnetic circuit means 128. The amount of the displacement may vary within a considerable range on which the principal limiting factors are record density and head length. For records now in common use, it is envisioned at present that the gaps may be spaced as far as .005", although this distance may be increased for environments which permit a greater separation. In one application a distance of .003" between the gaps has yielded good results. As in the case of FIG. 1, this distance must be less than the minimum space between poles in the magnetic record.

Since both the signal channels are intended to operate in the same signal track of the record medium, both channels are mounted to come within the lateral confines of a single track, e.g., .032 of an inch, according to the recording format commonly used with magnetic record tape at the present time.

Each of the magnetic circuits 126 and 128 is constructed about a generally symmetrical core structure of ferro-magnetic material which, for manufacturing convenience, may consist of a pair of generally U-shaped core pieces 134 and 136. Each core piece provides a base structure 138, a leg 140 and a face section 142. The ends of the base structures 138 of each pair of core pieces abut each other at their ends and together form a bridging member between the legs 140. The core pieces are preferably laminated structures and each may be composed of a plurality of plates stamped from a suitable alloy which has high permeability at low flux densities, such as the nickel-copper-iron alloy manufactured by Allegheny Ludlum Steel Corporation and sold under the trade name Mumetal.

Wound about each of the four core legs is a transducing coil, the coils being numbered respectively 144, 146, 148 and 150. The output leads of the coils are connected in series. The series connections must be such that the electromotive forces induced in all the coils are aiding each other when a magnetic pole of the record is located between the gaps 130 and 132. If so connected, then when the same pole is outside the gaps, the induced electromotive forces in the coils oppose and cancel one another.

The core pieces are pierced at the junction of their legs 140 with the face section 142 to provide ducts 152 and 154 adapted to receive and accommodate an excitation coil 156 which is passed through the duct 152 in the core pieces at one side of the gaps and returned through the duct 154 at the other side of the gaps. The excitation coil 156 is connected to an alternating signal generator 157.

Current through the excitation coil 156 induces changing magnetic excitation flux in each core leg around the intersection of the excitation conductor therewith. The frequency of the excitation current is at least twice that of the highest frequency record signal to be read. The permeability and hence the reluctance of each of the ferromagnetic core legs changes with its magnetization. This permeability approaches unity for magnetization approaching saturation. The amplitude of the excitation signal applied to the coil 156 is of such value that the excitation flux substantially magnetically saturates each core leg periodically.

As a result of the changing excitation flux induced in the portion of each core leg around the excitation coil 156 by the excitation current, the reluctance of each core leg between the reproducing gaps 130 and 132 and the respective transducing coils, 144, 146, 148 and 150 changes substantially in periodic fashion, i.e., at twice the frequency of the excitation current in the case of alternating current excitation. This periodical reluctance variation causes a corresponding substantial change of any steady signal flux passing through the core legs. During this action, there is generated in each output coil an alternating voltage which has an amplitude proportional to the magnetomotive force of the magnetic signal on the record carrier between the head gaps 130 and 132, and a frequency equal to twice the frequency of the excitation signal applied to the coil 156. This voltage is generated independent of any relative movement between the magnetic record carrier and the reproducing head. Furthermore, the phase of this potential is determined by the polarity of the magnetic record between the gaps 130 and 132.

FIGS. 10 to 14

Figure 9:
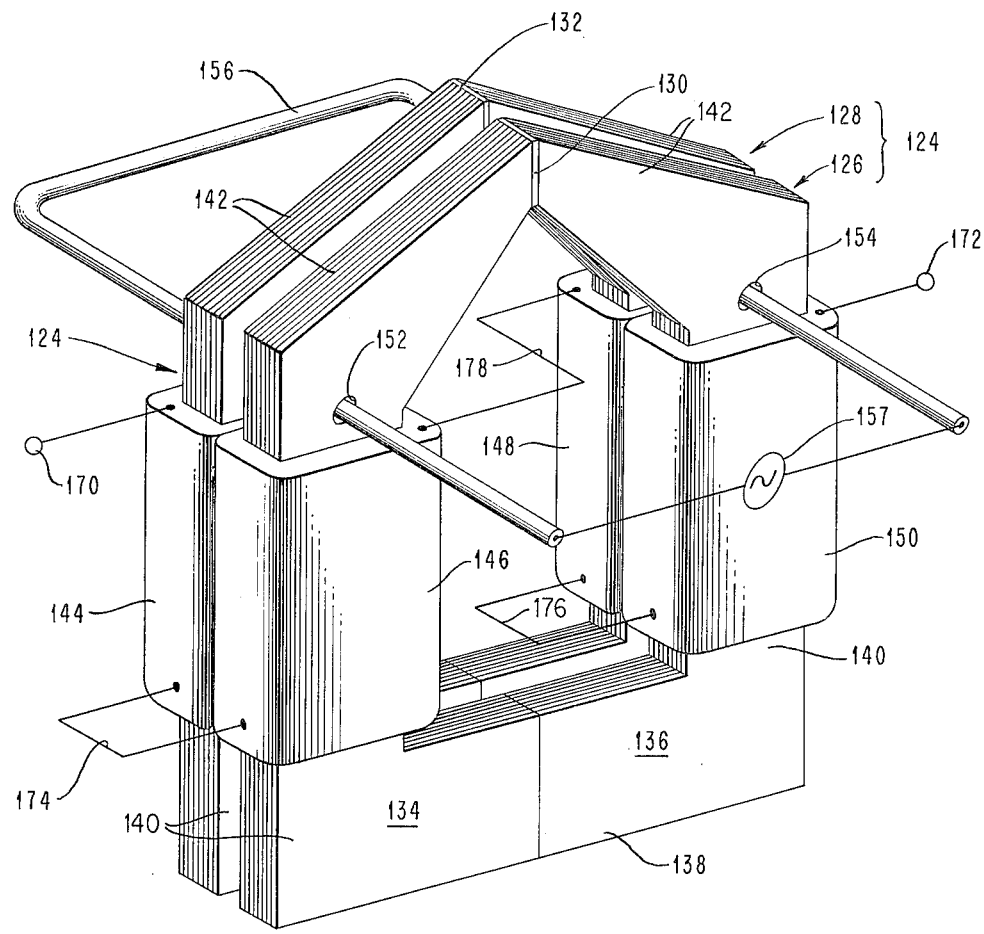
FIG. 9 is a perspective view of a modified form of transducer embodying the invention.
Figure 10:
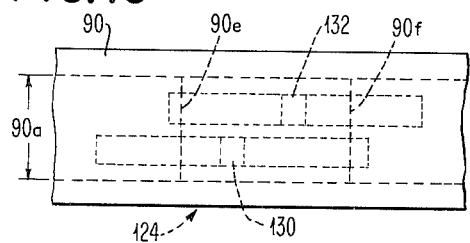
FIG. 10 is a view similar to FIG. 5, but showing the transducer of FIG. 9 rather than the transducer of FIG. 1.
Figure 11:
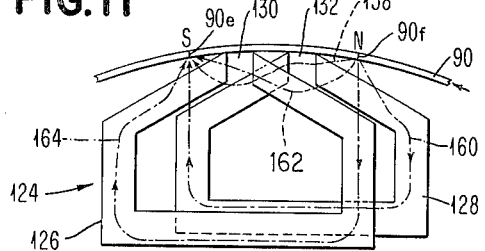
FIG. 11 is a view similar to FIG. 6, showing the transducer of FIG. 9 and flux paths therein for one condition of pole alignment.
Figure 12:
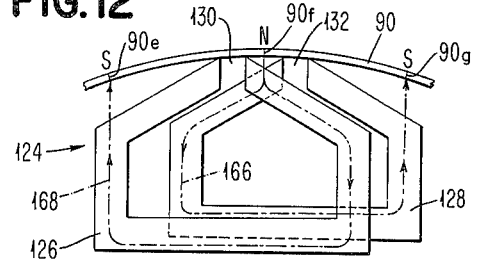
FIG. 12 is a view similar to FIG. 11, but showing the flux paths for a different condition of pole alignment.

These figures illustrate graphically the operation of the transducer head illustrated in FIG. 9. FIGS. 10, 11 and 12 show a tape 90, which may be the same as tape 90 of FIGS. 4 to 7, moving across a transducer 124 such as that shown in FIG. 9. In FIGS. 11 and 12, certain dimensions of the transducer have been distorted or exaggerated so as to present clearly the different magnetic flux paths which exist in the structure.

In FIGS. 10 and 11, the north pole 90f on the tape 90 is shown approaching the two gaps 132 and 130. The flux from the pole 90f extends from that pole to the corresponding south pole 90e along two paths through the magnetic circuit 128 and also along two paths through the magnetic circuit 126. The two paths in the circuit 128 are shown at 158 and 160. Path 158 extends through the gap 132 and consequently has a greater reluctance than the longer path 128, which does not have a non-magnetic gap other than the spaces between the tape 90 and the magnetic circuit 128. Consequently, most of the flux flows through the path 160, which means that it passes downwardly through the right-hand leg of the magnetic circuit 128, as viewed in FIG. 11, and upwardly through the left-hand leg.

The two paths from the pole 90f through the magnetic circuit 126 are shown at 162 and 164. Again, the path 162 passes through the non-magnetic gap 130, and so has a greater reluctance than the longer path 164, which does not include that non-magnetic gap. Thus most of the flux from the pole 90f passes downwardly through the right-hand leg of magnetic circuit 126 and upwardly through its left-hand leg.

FIG. 12 shows the conditions existing when the pole 90f has moved to a location between the gaps 132 and 130. The flux in the magnetic circuit 128 now follows the path 166, passing down through the left-hand leg of core 128 and up through the right-hand leg of that core and entering the tape 90 adjacent the south pole 90g. In the magnetic core 126, the flux from the north pole 90f passes downwardly through the right-hand leg of core 126 along the path 168, and upwardly through the left-hand leg of magnetic circuit 126, entering the tape at south pole 90e.

Consider now the four coils 144, 146, 148 and 150, shown in FIG. 9, and the electromotive forces induced therein by the magnetic flux under the conditions shown in FIG. 11. The excitation current in the coil 156 (see FIG. 9—not shown in FIG. 11) is effective to modulate the fluxes in all four of the legs, so that electromotive forces are induced in all four of the coils 144, 146, 148 and 150. As shown in FIG. 9, the four coils are connected in series between an output terminal 170 and an output terminal 172. All four of the coils are wound in the same direction, so that a flux passing in the same direction through all four coils would induce electromotive forces having the same directional relationship between the top and bottom ends of the coils. The coils 144 and 146 are connected in series opposition. Note that the bottom ends of the two coils are connected by a wire 174. The two coils 148 and 150 are likewise connected in series opposition. Note the wire 176 connecting the bottom ends of the two coils 148 and 150. The upper end of coil 144 is connected to input terminal 170. The upper end of coil 146 is connected through wire 178 to the upper end of coil 148. The upper end of coil 150 is connected to output terminal 172.

With this arrangement of electrical connections and with the fluxes in the coils directed as shown in FIG. 11, it may be seen that the electromotive force induced in coil 144 opposes the electromotive force in coil 146 and that the electromotive force in coil 148 opposes that in coil 150. The net output, assuming the fluxes in all four coils to be equal, is substantially zero potential between the output terminals 170 and 172.

Now consider the electromotive forces obtained when the flux distribution is that shown in FIG. 12. The electromotive force in coil 144 now aids that in coil 146, since the fluxes are in opposite directions in the two coils. Furthermore, the flux in coil 148 induces an electromotive force of the same polarity in the electrical circuit as the flux in coil 146. The flux in coil 150 also induces an electromotive force which aids the electromotive forces in the other three coils. There is thus produced between the output terminals 170 and 172 an output signal of substantial magnitude while the pole 90f is between the gaps 132 and 130. When there is no pole between the gaps, substantially no output signal is produced.

Figure 14:
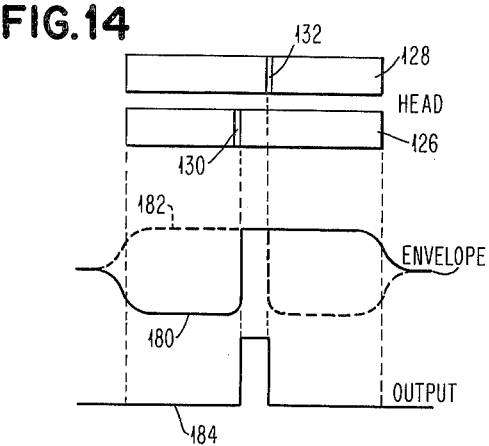
FIG. 14 is a diagrammatic illustration of the relationship between the gaps in the transducer of FIG. 9, the electromotive forces induced in the transducer coils, and the signal appearing across the output terminals.

The heavy line 180 in FIG. 14 illustrates the amplitude envelope of the electromotive force output of the two coils 146 and 150 as a pole moves across the two gaps. The dotted line curve 182 indicates the amplitude envelope of the electromotive force 182 produced in coils 144 and 148 as a pole moves across the two gaps. The curve 184 shows the resultant of adding algebraically the curves 180 and 182. It may be seen that the envelope of the output signal is substantially zero until the pole moves into the region between the gaps. In that region a substantial output signal having sharp edges is produced.

Figure 13:
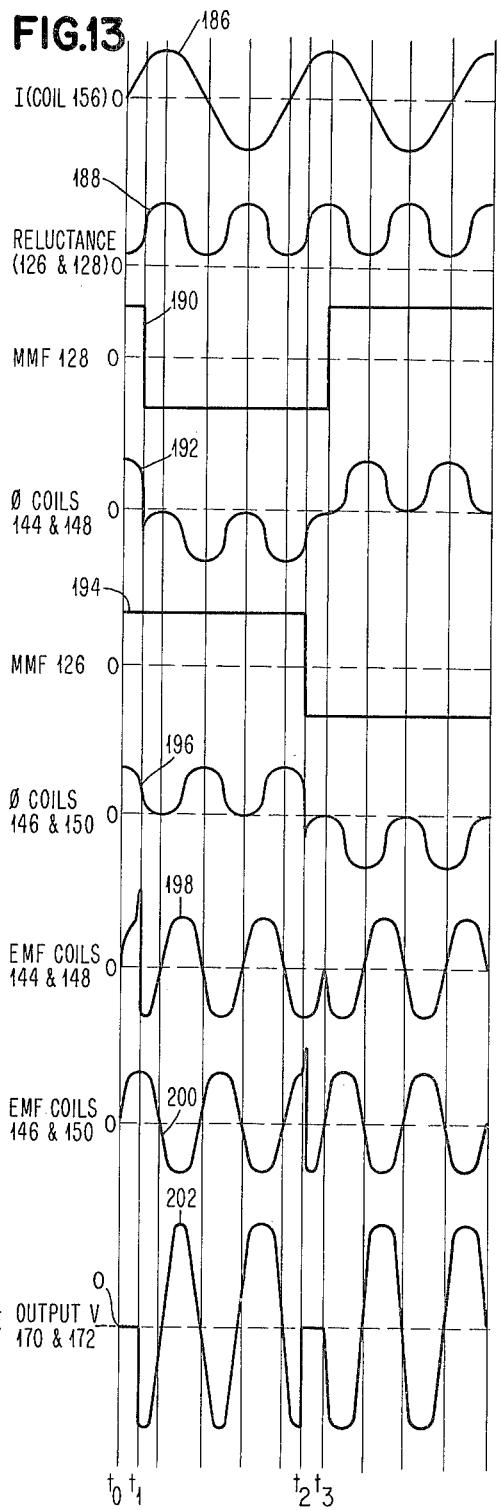
FIG. 13 is a graphical figure similar to FIG. 8, showing the variation of certain electrical and magnetic conditions in the transducer of FIGS. 9 to 12.

FIG. 13 illustrates graphically the electrical and magnetic conditions existing in the transducer of FIG. 9 during operation thereof. The curve 186 illustrates the sine wave of the alternating current supplied to the exciting coil 156. Curve 188 illustrates the reluctance variation in the magnetic circuits 126 and 128.

Curve 190 illustrates the variation of the magnetomotive force in the magnetic circuit 128. At the time $t_1$, the north pole 90f crosses the gap 132 in that magnetic circuit, thereby reversing the polarity of the magnetomotive force from the condition which produces the flux pattern illustrated in FIG. 11 to the condition which produces the flux pattern illustrated in FIG. 12. At the time $t_3$, the south pole 90g crosses the gap 132, again reversing the polarity of the magnetomotive force and restoring the curve 190 to the value indicated at $t_0$.

The curve 192 illustrates the variation in flux through the coils 144 and 148 due to: (a) the magnetomotive force illustrated by curve 190, and (b) the variation in reluctance illustrated by curve 188.

Curve 194 shows the variation in magnetomotive force in the magnetic circuit 126. At $t_2$, the north pole 90f crosses the gap 130, reversing the direction of the magnetomotive force in the circuit 126. It is assumed that the north pole 90f is to the right of the gap 130 at all times prior to time $t_2$ and that there is no intervening south pole between north pole 90f and the gap. It is also assumed that the north pole 90f is at the left of the gap 130 at all times later than $t_2$, and that there is no intervening south pole between pole 90f and the gap.

Curve 196 shows the variation in flux through coils 146 and 150 of FIG. 9 due to: (a) the variation in magnetomotive force shown by curve 194, and (b) the variation in reluctance shown by curve 188.

Curve 198 shows the variation in electromotive force in the coils 144 and 148. Since these two coils are associated with the same magnetic circuit 128, their electromotive forces vary concurrently, and it is convenient in the graphical analysis of FIG. 13 to treat that variation as the sum of the variations in the coils 144 and 148.

Curve 200 shows the variation in electromotive force in the coils 146 and 150. Again, these two coils are on the same magnetic circuit 126, and it is convenient to treat the sum of their electromotive force variations as a single variable.

The curve 202 is the algebraic sum of the curves 198 and 200. Each ordinate in curve 200 is reversed in sign and added to the ordinate in curve 198 to produce the corresponding ordinate in curve 202. It may be observed that the output signal between terminals 170 and 172 is substantially 0 between times $t_0$ and $t_1$, when there is no pole on the magnetic record between the two gaps 132 and 130, and also during the time interval $t_2$–$t_3$ when there is also no pole between the gaps 132 and 130. When a north pole is between the two gaps, an output signal is produced having a frequency twice that of the exciting current supplied to coil 156, as illustrated in the time interval $t_1$–$t_2$. When a south pole is between the gaps, as illustrated in the time interval beginning at $t_3$, there is a signal of the same double frequency at the output terminals, but that signal is opposite in phase to the signal produced between times $t_1$ and $t_2$.

It may be seen that the electromotive forces in the two sets of coils oppose each other when there is no pole between the gaps, but aid each other as long as a pole lies between the gaps. Furthermore, the output voltage has one phase when the pole between the gaps is a north pole and has the opposite phase when the pole between the gaps is a south pole.

Although FIG. 9 illustrates the use of four output coils 144, 146, 148 and 150, one on each of the four legs of the two magnetic circuits, other output coil arrangements are suitable. For example, output coils could be arranged only on two of the four legs. Any two legs could be selected for this purpose. The coils would have to be connected so that their electromotive forces add when a pole is between their gaps. If so connected, then necessarily the electromotive forces would be opposed when there was no pole between the two gaps, regardless of the selection of the particular pair of legs. As another alternative, a single coil might be used encircling one leg on one magnetic circuit and another leg on the other magnetic circuit. Again, the choice of legs in the specific magnetic circuit is not material. Furthermore, two such coils could be used, provided they are properly connected in series.

FIGS. 15-17

These figures generally correspond to FIGS. 10 to 12, respectively, and illustrate another arrangement of magnetic circuits which function in essentially the same manner as the magnetic circuits 124 and 126 of FIGS. 10 to 12.

Figure 15:
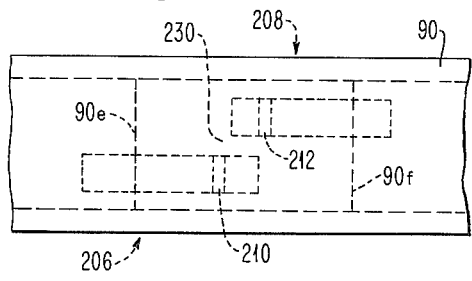
FIGS. 15 to 17 are similar to FIGS. 10 to 12, respectively, and illustrate a modified embodiment.
Figure 16:
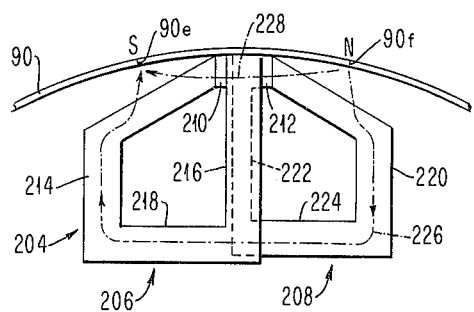
Figure 17:
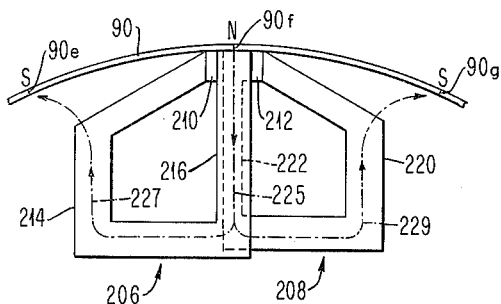

In FIGS. 15-17, there is shown a transducer head 204, including two separate magnetic circuits 206 and 208. The magnetic circuit 206 includes a gap 210 and the magnetic circuit 208 includes a gap 212. The spacing between the gaps 210 and 212 is subject to the same limitation as compared to the minimum spacing between poles on the record, as in the case of the previously described modifications of the invention.

The magnetic circuit 206 comprises an outer leg 214 defining the outer side of the gap 210 and extending from that gap in a direction generally away from the record member 90, and an inner leg 216 defining the inner side of the gap 210, and also extending away from the gap. The legs 214 and 216 are connected at their ends remote from the record member 90 by a bridging member 218.

The magnetic circuit 208 includes an outer leg 220 defining the outer side of the gap 212 and an inner leg 222 defining the inner side of the gap 212. The legs 220 and 222 extend away from the gap and the ends of those legs remote from the record 90 are connected by a bridging member 224. The magnetic circuits 206 and 208 are located side by side under the path of movement of the record 90, in such a fashion that the inner legs 216 and 222 lie closely parallel to each other, as best seen in FIG. 15.

When there is no pole on the record member between the gaps 212 and 210, the flux produced by the poles 90f and 90e in the record member follows the paths shown in FIG. 16 at 226 and 228. The path 226 has in it only one gap other than the gaps between the record member and the magnetic circuits. That one gap is the space between the inner legs 216 and 222, indicated at 230 in FIG. 15. The path 228, on the other hand, has both the gaps 210 and 212 in it, in addition to the gap 230. Consequently, most of the flux between the poles 90f and 90e flows through path 226.

FIG. 17 shows the flux pattern existing when a pole such as the pole 90f moves between the gaps 210 and 212. As there shown, the flux from the pole 90f flows downwardly through the inner legs 216 and 222 and then outwardly through the respective magnetic circuits 206 and 208, returning to the tape at the south poles 90e and 90g. It may be observed that the movement of the pole 90f across the gap 212 reverses the direction of the flux in the outer leg 220 of magnetic circuit 208, but does not reverse the direction of flux in the outer leg 214 of the magnetic circuit 206. Consequently, output coils mounted on those two legs might be connected in series in the same manner as the outer leg coils of FIG. 3. Alternatively, a single coil could be placed around one or both of the inner legs 216 and 222. Either the excitation coil 18 of FIG. 1 or the coil 156 of FIG. 9 could be used with the magnetic circuit of FIGS. 15 and 17.

FIGS. 18-20

These three figures illustrate a still further modification of the invention. These figures respectively correspond to FIGS. 15-17, and show a transducer head 232 differing from the transducer head 204 of FIGS. 15-17 only in that the inner legs of the two magnetic circuits 206 and 208 have been placed in abutting relation, thereby eliminating the gap 230.

The transducer head 232 includes two non-magnetic gaps 234 and 236. A leg 238 defines the outer side of the gap 234. A leg 240 defines the outer side of the gap 236. The ends of the legs 238 and 240 remote from the record member 90 are connected by bridging members 242 and 244 which abut at their inner ends so as to form effectively a single bridging member. A center leg 246 which corresponds structurally and functionally to the center leg or probe 14 of FIGS. 1-7 extends from the bridging members 242 and 244 and upwardly between the gaps 234 and 236, defining the inner surfaces of both of those gaps.

Figure 19:
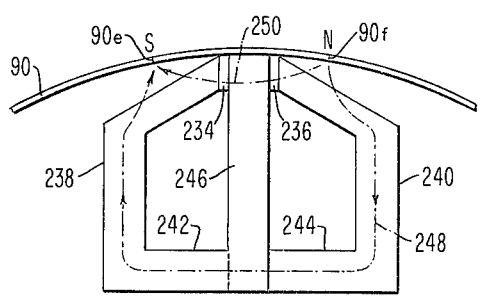
Figure 20:
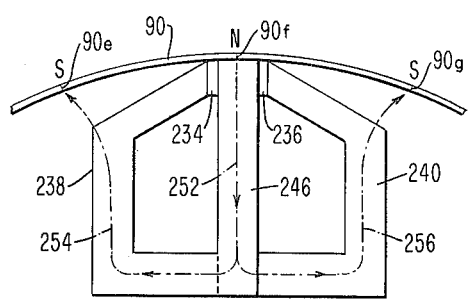

The variation in the flux paths in the transducer head 232 is illustrated in FIGS. 19-20. When there is no pole between the gaps 234 and 236, the flux from the pole 90f follows either of two alternative paths 248 or 250, which correspond to the paths 226 and 228 of FIG. 16, except that the gap 230 has been eliminated from both paths. When a pole such as 90f is located between the gaps 234 and 236, the flux paths follow the pattern shown in FIG. 20. The flux from pole 90f extends downwardly along the path 252 through the center leg 246 and divides at the bottom of that leg into two branch paths 254 and 256 which extend through the legs 238 and 240 respectively to the south poles 90e and 90g. It may be seen that the flux path 252 corresponds to the flux path 225 of FIG. 17 and that the flux paths 254 and 256 respectively correspond to the flux paths 227 and 229 of FIG. 17.

Figure 18:
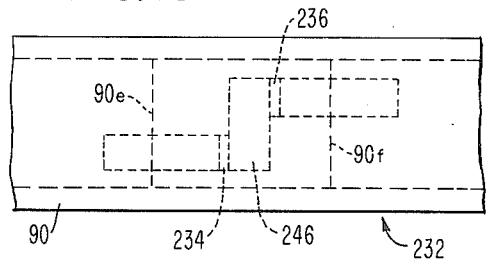
FIGS. 18 to 20 are also similar to FIGS. 10 to 12, respectively, and illustrate another modified embodiment.

It should be apparent that any output coil arrangement suitable for use with the magnetic structure of FIGS. 1 and 3 would be suitable for use with the magnetic structure of FIGS. 18 to 20. Furthermore, either of the exciting coil arrangements shown at 18 in FIGS. 1 and 3 or the exciting coil arrangement shown at 156 in FIG. 9 may be employed.

The structure of FIGS. 18 to 20 is subject to the same limitations with respect to the spacing between the gaps 234 and 236 as compared to the minimum pole spacing on the record, as that was described in connection with the other species of the present invention. Furthermore, where two output coils are used, they must be so connected that their electromotive forces add when a pole is located between the gaps 234 and 236.

While I have shown and described certain preferred embodiments of my invention, other modifications thereof will readily occur to those skilled in the art, and I therefore intend my invention to be limited only by the appended claims.

What is claimed is:

1. Apparatus for sensing a magnetic record, comprising:
   (a) magnetic read head means;
   (b) a magnetic record member;
   (c) means for relatively moving the read head means and the record member;
   (d) said record member carrying a magnetic record including unidirectionally magnetized poles, each pole being spaced from the next adjacent pole by at least a predetermined distance in the direction of said relative movement;
   (e) said read head means comprising magnetic circuit means defining two non-magnetic gaps adjacent the record member, said gaps being spaced in the direction of relative movement by a distance less than said predetermined distance,
   (f) said magnetic circuit means comprising:
      (1) a first leg defining the outer side of the gap first crossed by a pole on the record member during said relative movement;
      (2) a second leg defining the outer side of the gap last crossed by the record member;
      (3) additional leg means having portions defining the inner sides of the two gaps;
   (g) said record member and said magnetic circuit means cooperating when a pole on the record member crosses a gap to reverse the direction of flux in one only of said first and second legs while the direction of the flux in the other of said first and second legs remains constant, whereby a resultant of the fluxes in the first and second legs:
  (1) has a predetermined value when a pole on the record member is spaced outwardly from said two gaps in either direction, and
  (2) has a value substantially different from said predetermined value when the pole is between the gaps.

2. Apparatus as defined in claim 1, including means responsive to said resultant for producing an output signal.

3. Apparatus as defined in claim 2, in which said resultant responsive means comprises electric winding means linking said magnetic circuit means.

4. Apparatus as defined in claim 2, including:
  (a) means for cyclically varying the reluctance of at least a portion of said magnetic circuit means at a predetermined frequency; and
  (b) electric winding means in said resultant responsive means and linking said portion of the magnetic circuit means.

5. Apparatus as defined in claim 1, in which:
  (a) said first and second legs and said additional leg means extend generally perpendicularly from the record member;
  (b) said additional leg means comprises a single third leg; and
  (c) said magnetic circuit means further comprises a pair of bridging members, extending respectively between the first and second legs and the third leg, at the ends of the legs remote from the record member.

6. Apparatus as defined in claim 5, including:
  (a) means for cyclically varying the reluctance of said third leg at a predetermined frequency; and
  (b) electric winding means on said third leg for developing a substantial output signal only when a pole is between the gaps.

7. Apparatus as defined in claim 5, including:
  (a) means for cyclically varying the reluctance of said third leg at a predetermined frequency and
  (b) electric winding means on said first and second legs connected in series so that:
    (1) flux from a pole of the record member in a position spaced outwardly of the gaps induces equal and opposed electromotive forces in the windings, and no electric signal appears across the series-connected windings; and
    (2) flux from a pole of the record member in a position between the gaps induces aiding electromotive forces in the windings, and a substantial electric signal appears across the series-connected windings.

8. Apparatus as defined in claim 5, including means for cyclically varying the reluctance of said third leg at a predetermined frequency, said cyclically varying means comprising:
  (a) a single turn winding including one conductor extending through said third leg at a locality adjacent but spaced from one end thereof and returning through the third leg at a locality adjacent but spaced from the other end thereof; and
  (b) means for supplying alternating current to said winding of an amplitude to saturate said leg at said localties at the peaks of the alternating current cycles.

9. Apparatus as defined in claim 1, in which:
  (a) said first and second legs and said additional leg means extend generally perpendicularly from the record member;
  (b) said additional leg means comprises third and fourth legs spaced transversely of the record member; and
  (c) said magnetic circuit means further comprises first and second bridging members extending between said legs at the ends thereof remote from the record member, said first bridging member extending between said first leg and one of the third and fourth legs, said second bridging member extending between said second leg and the other of said third and fourth legs.

10. Apparatus as defined in claim 9, including electric windings on at least two of said four legs and connected in series so that:
  (a) flux from a pole of the record member in a position spaced outwardly of the gaps induces equal and opposed electromotive forces in the windings, and no electric signal appears across the series-connected windings; and
  (b) flux from a pole of the record member in a position between the gaps induces aiding electromotive forces in the windings, and a substantial electric signal appears across the series-connected windings.

11. Read head means useful in apparatus for sensing a movable magnetic record, said record including magnetic poles, each pole being spaced from the next adjacent pole in the direction of movement of said record by at least a predetermined distance, said read head means comprising:
  a magnetic circuit including at least three legs spaced at ends thereof so as to define two non-magnetic gaps, said magnetic circuit being adapted to be disposed so that said gaps are positioned adjacent said record, said gaps being spaced in the direction of movement of said record by a distance less than said predetermined distance, said legs being magnetically coupled together at the other ends thereof.

12. Read head means useful in apparatus for sensing a movable magnetic record, said record including magnetic poles, each pole being spaced from the next adjacent pole in the direction of movement of said record by at least a predetermined distance, said read head means comprising:
  a magnetic circuit including three legs spaced at ends thereof so as to define two non-magnetic gaps, said magnetic circuit being adapted to be disposed so that said gaps are positioned adjacent said record, said gaps being spaced in the direction of movement of said record by a distance less than said predetermined distance, said legs being connected together at the other ends thereof.

13. Read head means useful in apparatus for sensing a movable magnetic record, said record including magnetic poles, each pole being spaced from the next adjacent pole in the direction of movement of said record by at least a predetermined distance, said read head means comprising:
  a magnetic circuit including four legs spaced at ends thereof so as to define two non-magnetic gaps, said magnetic circuit being adapted to be disposed so that said gaps are positioned adjacent said record, said gaps being spaced in the direction of movement of said record by a distance less than said predetermined distance, one of said gaps being defined by ends of first and second ones of said legs, the other of said gaps being defined by ends of the third and fourth ones of said legs, the other ends of said first and second legs being connected together, and the other ends of said third and fourth legs being connected together, the connected ends of said first and second legs being spaced from the connected ends of said third and fourth legs so as to be magnetically coupled thereto.

14. Read head means useful in apparatus for sensing a movable magnetic record, said record including magnetic poles, each pole being spaced from the next adjacent pole in the direction of movement of said record by at least a predetermined distance, said read head means comprising:
  a magnetic circuit defining two non-magnetic gaps, said magnetic circuit being adapted to be disposed so that said gaps are positioned adjacent said record, said gaps being spaced in the direction of movement of said record by a distance less than said predetermined distance, said magnetic circuit being formed from:
- (a) a first leg one end of which defines the outer side of one of said gaps;
- (b) a second leg one end of which defines the outer side of the other of said gaps; and
- (c) additional leg means having portions defining the inner sides of said gaps,
    - (1) the other ends of said first and second legs and said additional leg means being magnetically coupled together;
    - (2) said first and second legs having portions adjacent to the ends of said legs defining said gaps that extend away from and outwardly of said gaps.

References Cited by the Examiner

UNITED STATES PATENTS

| | | | |
|---|---|---|---|
| 2,892,041 | 6/1954 | Rubens et al. | 179—100.2 |
| 2,855,464 | 10/1958 | Wiegano | 179—100.2 |
| 2,905,770 | 9/1959 | Kornei | 340—174.1 |
| 2,915,597 | 12/1959 | Wanslaus et al. | 340—174.1 |
| 2,995,631 | 8/1961 | Rubens | 179—100.2 |

IRVING L. SRAGOW, *Primary Examiner.*